Patented Sept. 13, 1949

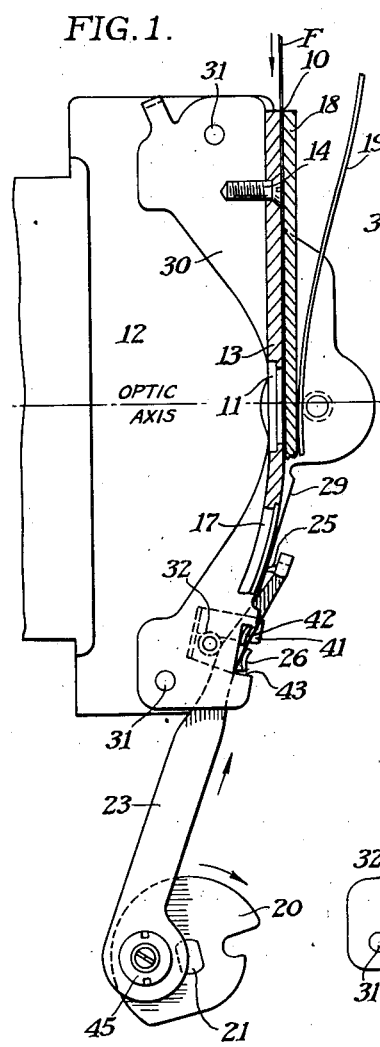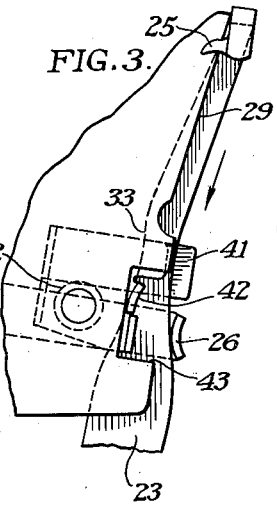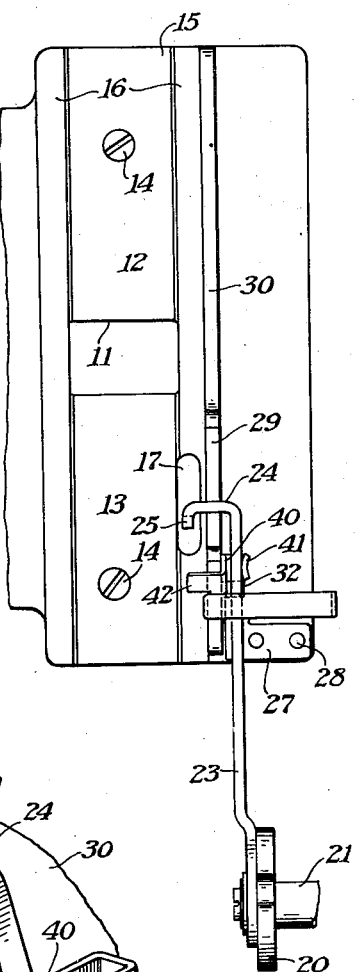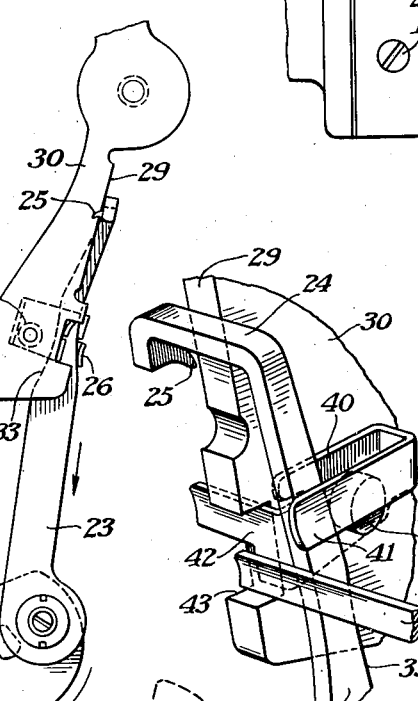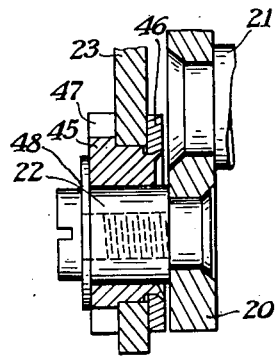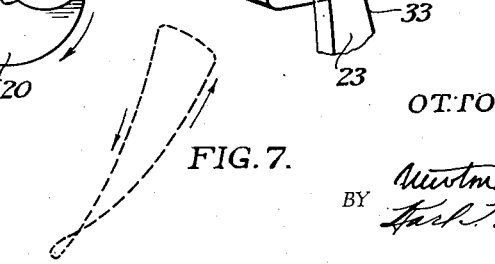

2,481,706

UNITED STATES PATENT OFFICE 2,481,706

INTERMITTENT FILM-ADVANCING MECHANISM

Otto Wittel, Rochester, N. Y., assignor to Eastman Kodak Company, Rochester, N. Y., a corporation of New Jersey Application March 20, 1948, Serial No. 16,083

8 Claims. (Cl. 88—18.4)

This invention relates to photography and particularly to a film-advancing means for intermittently feeding a perforated motion picture film past an exposure aperture in a cinematographic apparatus.

Two generally different types of intermittent claw pull-down mechanisms have been used in the past in cinematographic apparatus. One of these is the claw pull-down mechanism of the ratchet type wherein the claw is reciprocated by an eccentric member and is normally forced into the film path by a spring and the claw tip ratchets out of the engaged perforation and along the perforated edge of the film during the upstroke. The other type is where the up-and-down and in-and-out movement of the claw is controlled by separate cooperating cams and follower surfaces.

The ratchet type pull-down claw mechanism possesses the advantages of mechanical simplicity and being inexpensive, but has the disadvantages that it is hard on the film and it is difficult to keep the claw in engagement with the film perforation during the pull-down stroke without there being a sawing action occur between the claw and the engaged perforation edge. From the operational standpoint, the pull-down mechanisms using two separate cams for producing the pull-down stroke and the in-and-out movements of the claw are better than the ratchet type claw mechanisms. However, from the mechanical standpoint, they are much more expensive and difficult to keep in operation because of the critical synchronism required between the rotation of the cams that is necessary and because of the exacting nature of the cam surfaces to produce the required motions.

The primary object of the present invention is to provide an intermittent claw-advancing mechanism which has the advantages of the ratchet-type claw mechanisms and the dual cam-type claw feeds, but none of the disadvantages characteristic of each.

Another object is to provide an intermittent claw film-feeding mechanism which includes a claw reciprocated by an eccentric to obtain the required up-and-down stroke and which includes two stationary guiding surfaces engaged by two separate follower surfaces on the claw member to control the in-and-out movement of the claw relative to the film path.

And, another object is to provide an intermittent claw film-advancing mechanism in which the claw is retracted from the engaged film perforation at the end of the pull-down stroke and is held retracted during the return stroke of the claw and is allowed to enter a film perforation at the beginning of the pull-down stroke and is held in engagement with the perforation throughout the pull-down stroke without a sawing action occurring between the claw and the engaged edge of the film perforation, all without benefit of a single driven cam.

And, another object is to provide a claw-type film-advancing mechanism which is extremely simple in construction while at the same time being very efficient in operation.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which Fig. 1 is an enlarged fragmentary side elevation of the front end of a motion picture camera, partly in section, showing a pull-down mechanism constructed in accordance with a preferred embodiment of the present invention and with the parts shown in the positions they assume when the claw has just started its return stroke after having advanced the film one frame;

Fig. 2 is a fragmentary side elevation of the claw mechanism showing the parts in the position they assume just after the claw has started its pull-down stroke;

Fig. 3 is an enlargement of that portion of Fig. 2 including the claw end of the claw member and the parts engaged thereby to bring out the details of these parts and their engagement with more clarity;

Fig. 4 is an elevational view looking at the film gate from the rear and with the movable gate member removed;

Fig. 5 is an enlarged perspective detail showing the spring for forcing the claw toward the gate and showing the fingers for guiding the claw member laterally of the film gate;

Fig. 6 is a sectional detail taken through the eccentric mounting for the claw member and showing how the length of the claw stroke can be varied; and Fig. 7 is a diagrammatic view illustrating the path of the tip of the film claw during one complete stroke of the claw member.

Like reference characters refer to corresponding parts throughout the drawings.

Referring now to the drawings, and particularly

Figs. 1 and 4, the present pull-down mechanism is adapted for advancing a motion picture film "F" through the gate 10 of a motion picture camera and across an exposure aperture 11 which is optically aligned with the camera objective, not shown. The shutter, not shown, for intermittently cutting off the light entering the objective, as is well known, is adapted to be mounted in a shutter housing 12 mounted at the front of the camera and fixed to the mechanism plate 10 within the camera body, not shown.

Film gate 10 comprises an aperture plate 13 fixed to the rear of the shutter housing 12 by screws 14. As clearly shown in Fig. 4, this aperture plate has its center portion 15 offset from a pair of rails 16 which engage the perforated margins of the film and prevent the picture area of the film from rubbing on the gate member. One of the rails is provided with a recess 17 into which the tip of the claw may extend during the pull-down stroke. As clearly shown in Fig. 1, the lower end of the gate, or that portion below the exposure aperture, is curved forwardly of the optical axis. The film "F" is held flat against the rails 16 of the aperture plate 13 by a rear gate member 18 which is normally spring-pressed thereagainst by a spring 19, as is common practice. This rear gate member conforms in shape and size to the aperture plate and has a cut-out portion, not shown, which allows the claw to pass therethrough to engage the film strip.

The pull-down claw mechanism which is adapted to intermittently advance the film strip from a supply loop, not shown, in advance of the gate past the exposure aperture 11 and thence to a supply loop, not shown, beyond the gate will now be described. Below and to one side of the gate is located a driving disk 20 fixed to a shaft 21 which is connected to a spring motor, not shown. As illustrated, this disk is to be driven clockwise. Rotatably mounted on a pin 22 carried by this disk eccentrically of its center is a claw member 23 which is reciprocated up-and-down as the disk rotates. The upper end of the claw member is bent at right angles to the main body of the member, as shown at 24 in Fig. 4, and on the end of this turned-over portion of the claw member, which extends transversely of the gate, there is a claw 25 which is adapted to extend into a film perforation during the pull-down stroke to advance the film.

The claw is normally forced toward the film path by a spring finger 26 engaging the rear edge of the claw member and which spring finger is formed up from a clip 27 mounted on the rear end of the shutter housing by screws, as indicated at 28 in Fig. 4. The depth of penetration of the claw into the film perforations, or across the film path, is controlled by a straight guiding surface 29 on the edge of a part of a bracket 30 fixed to the shutter housing by screws 31. This guiding surface 29 is engaged by the bent-over portion 24 of the claw member and is accurately finished and hardened because the part 24 of the claw member slides along this surface during the pull-down stroke of the claw. Although this guiding surface is straight and is substantially parallel to a tangent to the curved portion of the gate, because of the oscillating action of the eccentrically mounted end of the claw member during the pull-down portion of its cycle, along with the sliding fulcrum action of the portion 24 of the claw member on guiding surface 29, the tip of the claw inscribes a curved line path (see Fig. 7) which corresponds to the curvature of that portion of the aperture plate traversed by the claw. As a result, the claw maintains the same penetration into the film perforation throughout the pull-down stroke and there is no undesirable sawing action between the claw and the edge of the engaged perforation as is characteristic of some existing pull-down mechanisms.

Just as soon as the claw member starts its up or return stroke, it is desirable to positively retract the claw from the engaged film perforation and to hold it retracted throughout the return stroke of the claw. To this end, I fix a guide pin 32 to the bracket 30 against which the forward edge of the claw member is forced the instant the claw starts its upstroke. That portion of the forward edge of the claw member adapted to engage said guide pin is provided with a cam surface 33 which, when moved over the guide pin, will cause the claw to be retracted from the engaged film perforation and remain retracted during the upstroke of the claw. (See Fig. 7.) It will be noticed that when the cam surface 33 is engaging the guide pin on the upstroke of the claw, the bent-over portion 24 of the claw member is spaced from and does not engage the guiding surface 29. On the other hand, during the pull-down stroke when the portion 24 of the claw member is riding on the guiding surface 29, the cam surface 33 is held clear of the guide pin 31.

As shown in enlarged and exaggerated form in Fig. 7, the tip of the claw makes an inside loop at the end of the pull-down stroke just as it starts on the upstroke. However, during this time the claw leaves the engaged film perforation freely and without its upper edge hitting the upper edge of the perforation and thus tending to reverse the direction of the film because the film-engaging end of the claw is tapered to a point and is capable of a substantial movement relative to the film perforation. To reduce friction between the spring finger 26 and the rear edge of the claw to a minimum, the spring finger is bowed away from the claw member as shown. There will be a minimum of friction between the bent-over portion 24 of the claw member and the guiding surface 29 because, as shown in Fig. 3, only the corner of the portion 24 of the claw member engages the guiding surface 29 during the major portion of the pull-down stroke.

The claw member 23 is guided laterally of the film gate by a pair of spaced fingers 40 and 41 which engage opposite faces of the claw member, as clearly shown in Figs. 4 and 5. These fingers are carried by a support which is mounted on the guide pin 32 and which includes a turned-over end 42 engaging a notch 43 in the edge of the bracket 30 to prevent the support from turning on the guide pin. (See Fig. 5.) To reduce friction between these fingers and the faces of the claw member, the fingers may be bowed away from the engaged faces of the claw member, as shown.

To allow a certain amount of factory adjustment in the stroke of the claw, a mounting for the claw on the eccentric of the type shown in Fig. 6 may be used. As shown in this figure, the claw member 23 encircles an eccentric shoulder on the bearing 45 which is, in turn, rotatably mounted on the pin 22 fixed to the disk 20. The claw member is frictionally held on the bearing 45 between a washer 46 staked to the bearing and a flange 47 on the outer end of the bearing. The bearing 45 is, in turn, rotatably confined on the pin 22 by a washer and screw combination 48, the screw engaging a tapped bore in the pin 22. The flange 47 of the bearing is provided with a pair of diametrically opposite slots to receive a spanner wrench by the use of which the bearing may be turned relative to the claw member if the latter is held against rotation. The length of stroke of the claw can thus be shifted over a range equal to the eccentricity of the shoulder of the bearing 45 engaged by the claw member.

It will thus be seen that I have provided a claw pull-down mechanism which has the mechanical simplicity of one of the ratchet type but which provides for the positive retraction of the claw from engagement with the film during the return or upstroke. The desired in-and-out movement of the claw relative to the film path is accomplished without the use of driving cams which require synchronous operation. Throughout the pull-down stroke the claw maintains a fixed penetration relative to the engaged film perforation so that there is no sawing action between the film-engaging edge of the claw and the edge of the engaged perforation to damage the film or upset the amount and smoothness of the film advanced.

Although I have shown and described certain specific embodiments of my invention, I am fully aware that many modifications thereof are possible. My invention therefore is not to be restricted except insofar as is necessitated by the prior art and by the spirit of the appended claims.

Having thus described my invention, what I claim is new and desire to secure by Letters Patent of the United States is:

1. A film-advancing assembly for intermittently feeding a perforated film strip through a path defined by a guideway and comprising the combination with a claw member having a claw on one end thereof for intermittently engaging successive perforations of said film strip and including an eccentric member for reciprocating said claw member through a pull-down stroke, of means for causing said claw to engage a film perforation at the beginning and during said pull-down stroke and for retracting said claw from the engaged perforation at the end of the pull-down stroke and maintaining it retracted throughout the return stroke of said claw, said means including means for normally forcing said claw member toward the guideway, a pair of stationary guiding surfaces disposed adjacent said guideway and spaced from one another lengthwise thereof, and a pair of follower surfaces on said claw member and spaced lengthwise thereof, one of said follower surfaces adapted to engage one of said guide surfaces during movement of the claw member in one direction and the other follower surface adapted to engage the other guiding surface during movement of the claw member in the other direction for controlling the position of the claw relative to the film path.

2. The combination according to claim 1, in which that portion of the film path traversed by the claw is curved away from the claw member, one of said guiding surfaces is straight, and substantially parallel to a tangent to the curved portion of the film path and is as long as the pull-down stroke of said claw member, and the follower surface on the claw member adapted to engage this guiding surface is at the free end of the claw member adjacent the claw and is adapted to engage this surface during the pull-down stroke, whereby the combined action of the eccentric member on the claw member and the sliding engagement between said guiding surface and the free end of the claw causes the film-engaging end of the claw to move in a curved path corresponding to that of the curved portion of the film path.

3. A film-advancing assembly for intermittently feeding a perforated film strip through a path defined by a guideway and comprising the combination with a claw member having a claw on one end thereof for intermittently engaging successive perforations of said film strip and including an eccentric member connected to the other end of the claw member for reciprocating said claw member through a pull-down stroke, of means for causing said claw to engage a film perforation during its pull-down stroke and for retracting said claw from the film perforation at the beginning of the return stroke and maintaining it retracted throughout the return stroke, said last-mentioned means including means normally forcing said claw member toward the film path, a guiding surface adjacent the guideway and extending the length of the pull-down stroke adapted to be engaged by a portion on said claw member adjacent said claw during the pull-down stroke to control the extent of penetration of the claw into the film path, a fixed guide pin disposed adjacent said guideway and intermediate the ends of said claw member, and the edge of said claw member provided with a cam surface extending lengthwise thereof and including a portion which is adapted to engage said guide pin at the end of the pull-down stroke and during the return stroke thereof to retract and hold the claw out of the film path.

4. The combination according to claim 3 in which said guiding surface is on the end of a plate located to one side of said guideway and extending to the rear thereof, the main body of the claw member and the eccentric member for driving the same lie in planes to one side of the guideway and said claw is connected to the main body of said claw member by an arm extending substantially at right angles to the body of the claw member and transversely of said guideway and guiding surface, whereby said arm is adapted to engage and ride on said guiding surface during the pull-down stroke of said claw to control the depth of penetration of said claw into the film perforations.

5. A film-advancing assembly for intermittently feeding a perforated film strip through a path defined by a stationary guideway and comprising the combination with a claw member having a claw on one end thereof for intermittently engaging successive perforations of said film strip and including an eccentric member connected to its other end for reciprocating said claw member through a pull-down stroke, of means for causing said claw to engage a film perforation at the beginning and during said pull-down stroke and for retracting said claw from the engaged film perforation at the end of the pull-down stroke and maintaining it retracted throughout the return stroke of the claw, said means including a bracket fixed to the guideway and including a portion disposed to one side of and extending rearwardly of the film path and terminating in a guiding edge extending longitudinally of the film path, a spring normally acting on the claw member to force the claw end thereof toward the guideway, a follower on the claw member adjacent the claw bearing end thereof adapted to engage said guiding edge during the pull-down stroke to control the depth of penetration of the claw into the film path, a guide pin fixed to said bracket and extending substantially parallel to said film path and disposed in front of the film and below the portion traversed by the claw, a cam surface on the front edge of said claw member adapted to engage said guide pin at the end of the pull down stroke of said claw member and during the return stroke thereof, the cooperation between said guide pin and cam surface acting to retract the claw from the engaged film perforation at the beginning of the return stroke of the claw member and keeping it retracted throughout said return stroke.

6. The combination according to claim 5 in which the spring normally acting on the claw member to force the claw end thereof toward the film path comprises a leaf spring fixed to the guideway and engaging the rear edge of said claw member, said spring being bowed away from said claw member to reduce the frictional contact between the two parts.

7. The combination according to claim 5 and including means for guiding the claw member transversely of said guideway, said last-mentioned means comprising a support member pivoted on said bracket and including a pair of spaced fingers adapted to engage opposite faces of said claw member, a portion of said support member extending substantially at right angles to said spaced fingers and engaging a notch in the edge of said bracket to prevent the support from pivoting on said bracket in response to frictional forces between the spaced fingers and the claw member.

8. The combination according to claim 5 in which that portion of the film path traversed by the claw is curved away from the claw member, said guiding edge is straight and substantially parallel to a tangent to the curved portion of said film path, and the eccentric member is below and slightly forward of the portion of the guideway traversed by said claw, whereby movement of the lower end of the claw member during the pull-down stroke sets up a fulcrum action between said guiding edge and the follower on the claw member which causes said claw to follow a curve corresponding to that of the film path.

OTTO WITTEL

REFERENCES CITED

The following references are of record in the file of this patent:

UNITED STATES PATENTS

| Number | Name | Date |
|---|---|---|
| 2,076,189 | Wittel | Apr. 6, 1937 |
| 2,346,070 | Fuller | Apr. 4, 1944 |